United States Patent Office.

FRANCIS W. CROSBY, OF TOLEDO, IOWA.

Letters Patent No. 72,980, dated January 7, 1868.

---

IMPROVED METHOD OF ROASTING METALLIC ORES.

---

*The Schedule referred to in these Letters Patent and making part of the same.*

---

TO ALL WHOM IT MAY CONCERN:

Be it known that I, FRANCIS W. CROSBY, of Toledo, Tama county, Iowa, but at present in the city, county, and State of New York, have invented a new and useful Method of Roasting Metallic Ores when in a fine or pulverized condition; and I do hereby declare the following to be a full, clear, and exact description thereof.

The nature of my invention consists in opening passages for the circulation of the heat and gases needed in the reduction and purification of metallic ores, throughout a mass of pulverized ore, in the reducing-chamber of a furnace, to facilitate and insure its speedy desulphurization and reduction.

Difficulty has always been experienced in roasting pulverized ores, from the fact, that owing to the fineness of the particles, the ore when in mass packs so closely as to prevent a draught and passage of heat, and of the reducing-gases through the same.

To obviate this difficulty various expedients have been resorted to, such as moulding the ore into bricks, or balls, or chunks preparatory to submitting the same to the action of the fire; sifting the ore through currents of flame and gases, &c., all of which have proven to be tedious and expensive in their nature.

I have sought to obtain, and have invented, a cheap as well as reliable means of accomplishing the desired end, which is free from the disadvantages of those heretofore used, and is applicable to any of the ordinary forms of furnaces, having a chamber for the generation of heat distinct or separate from the reducing-chamber to contain the ore, and which are provided with suitable communicating-flues or apertures for conducting the heat, flame, &c., into the reducing-chamber.

In my process I prefer to use a furnace having an ore-chamber constructed immediately over the fire-chamber, the floor of the former being supported upon an arch forming the roof of the latter. A large number of flues or air-passages are made through the arch and floor, opening directly or indirectly from the one chamber to the other, through which the products of combustion may pass freely into the ore-chamber.

Within the ore-chamber of the furnace, constructed substantially as described, I place a number of rods in an upright position, so that their lower ends shall rest upon and cover, or pass into, or otherwise connect with, the openings of the flues or passages leading from the fire-chamber; the rods being of such length as to project outwardly above the top of the furnace.

Having thus arranged these rods, in such number as may seem sufficient, I throw into the ore-chamber, and around these rods, the loose or pulverized ore in a wet or moistened state. I first wet the pulverized ore so that it shall pack closely in the chamber about the upright rods, and to insure greater tenacity in the mass of pulverulent ore when thus packed, and to prevent it from crumbling so soon as dry, it may be found advantageous to mix therewith a small proportion of fine clay, lime, or other matter.

After the moistened ore has properly set around the rods, I withdraw them, leaving thereby passages for the heat, flame, and gases from the fire throughout the mass. To perfect my process, and render the mass of ore in the furnace as porous and pervious to the action of the heat, &c., as possible, I mingle, with the ore, straw, coarse hay, or other long, fibrous, inflammable material, so that it shall ramify through the same in every direction. So soon as the heat of the fire, penetrating through the passages left by the withdrawal of the rods, reaches the straw or fibrous material, it speedily consumes the same, opening thousands of new passages for the gases of combustion, and producing an exceedingly porous condition of the mass, most favorable to the speedy and effective action thereon of the agents for its decomposition and reduction.

I contemplate the use, as hereinbefore set forth, of the rods, and of the admixture of straw or other long, fibrous inflammable material, not only in combination, as just described, but each independently of the other, to produce the necessary draught-opening through a mass of pulverized ore.

Having thus fully described my invention, I claim therein as new, and desire to secure by Letters Patent of the United States—

The method, substantially as herein described, of obtaining a porous disposition of pulverized ores within the reducing-chamber of a furnace, for the purpose set forth.

As witness my hand, this 17th day of June, 1867.

F. W. CROSBY.

Witnesses:
R. M. HOWLAND,
WOODHULL HELM.